April 9, 1957  G. F. SCHERER  2,788,017
LUBRICATED BALL VALVES
Filed Jan. 11, 1950  2 Sheets-Sheet 2

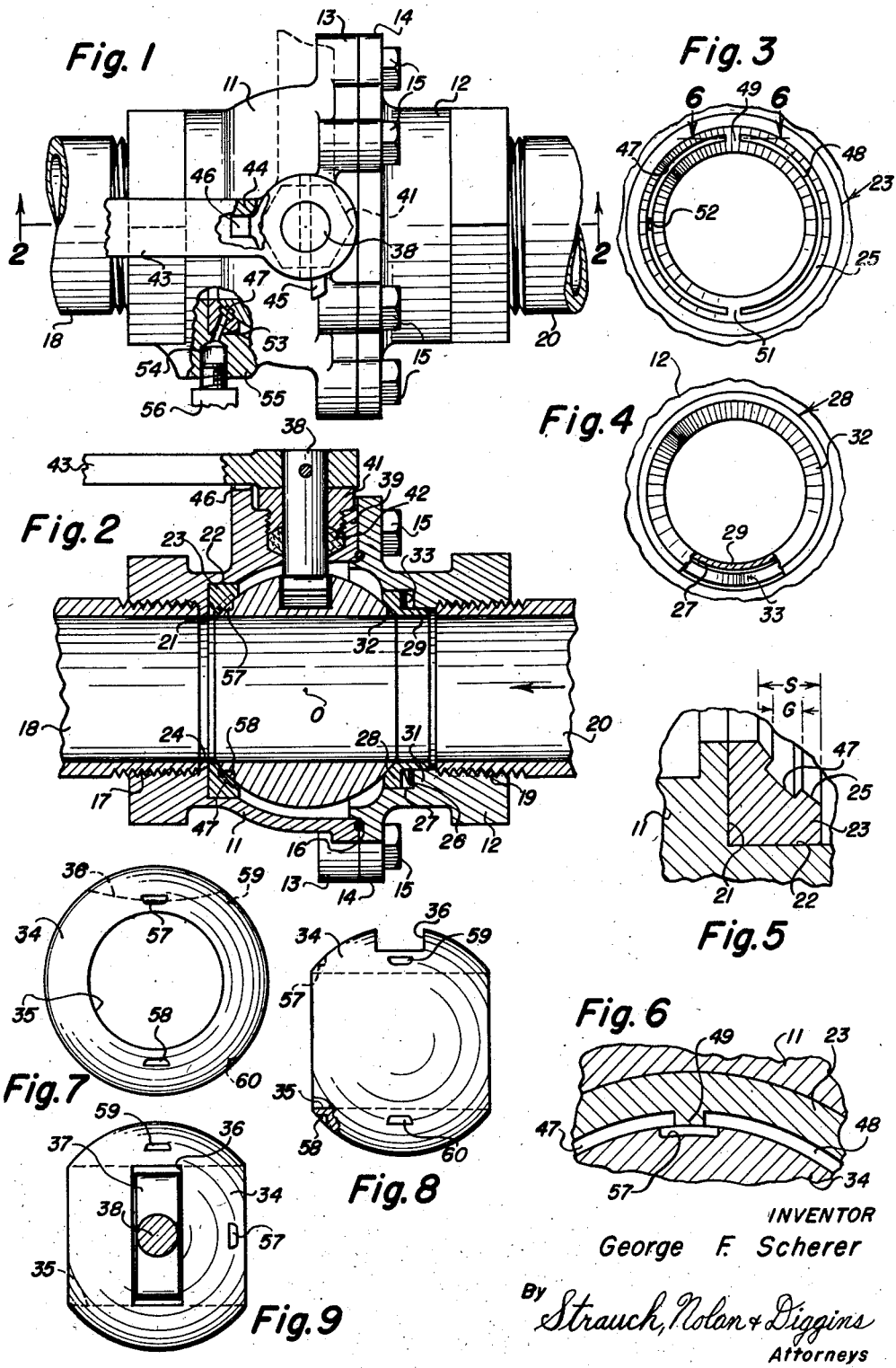

INVENTOR
George F. Scherer
By Strauch, Nolan + Diggins
Attorneys

United States Patent Office 2,788,017
Patented Apr. 9, 1957

2,788,017

LUBRICATED BALL VALVES

George F. Scherer, Oakland, Calif., assignor to Rockwell Manufacturing Company, Pittsburgh, Pa., a corporation of Pennsylvania Application January 11, 1950, Serial No. 138,030

2 Claims. (Cl. 137—246.19)

This invention relates to ball type valves for high pressure and large pipe line service and is particularly directed to such valves wherein provision is made for supplying an adequate plastic film of sealing material to at least the downstream seat between the ball and the valve body and wherein provision may be made for jacking the ball from its seat through the medium of lubricant pressure.

In present day pipe line service it has been customary to employ tapered plug valves with the plugs having rectangular through openings aligned with the pipe line at opposite sides, provision being made for providing sealing films of lubricant between the plug and body surfaces of the valve for preventing escape of line fluid. In most of these plug valves, provision is also made for jacking the valve plug in a direction parallel to the axis of rotation of the plug whereby frozen plugs may be released for turning and the effect of upstream pressure tending to tightly press the plug against the downstream side of the body bore may be relieved to lessen the torque required to turn the plug.

Each of these plug valves, because of its structural form, provides a restriction in the pipe line which results in pressure losses. Furthermore, it has become customary, in long distance pipe lines which handle fluids that may deposit or form residues on the lining of the pipe and thereby cut down the effective diameter of the pipe and increase fluid friction between the fluid being handled and the pipe line, thereby resulting in excessive pressure losses, to periodically scrape the interior of these pipe lines to clean and restore them to the original diameter. The restrictions in the pipe line offered by present day plug valves have produced difficulties because a scraper which will pass the main pipe line may not pass through the restriction in the rectangular opening valve, so that special cleaning efforts and devices are necessary to remove the scraped material at these valves.

Since it is practically universally accepted in the art that these lubricated plug valves are the only valves capable of handling these high pressures and for large pipe line services, these difficulties have been substantially accepted as unavoidable. Furthermore, since quick opening and closing is extremely desirable, and often necessary, plug valves that require only rotation through 90° between fully open and fully closed positions fulfill this requirement better for example than gate valves some of which take considerable time to open or close because of low mechanical advantage in the threaded stems. However, these plug valves by reason of their structure possess inherent conditions in operation that render them increasingly less desirable as the line pressure increases. For example, in the case of a plug valve which is rotatable within a bore upon an axis normal to the axis of the pipe line in which it is situated, when the valve is in closed position the upstream pressure tends to separate the valve plug from the upstream side of the bore and to urge it tightly toward the downstream side of the bore. Where the valve plug and its associated bore are of tapered conical or cylindrical shape, the plug contacts the bore at the downstream side in substantially only line contact above and below the downstream side port in the bore leading to the pipe line. This means that, in the absence of some special added sealing arrangement, this line contact is substantially the only seal between the plug and the bore that resists leakage of the fluid from the upstream side of the valve, the fluid passing around the sides of the plug; and since the line contact between the plug and the bore substantially bisects the downstream port opening, even if this seal was perfect there would still be spaces at the side edges of the downstream port where the upstream fluid could force itself past the plug and therefore through the valve.

In plug valves as used in high pressure service, this problem is taken care of by so-called lubrication of the valve wherein however the essential and primary function of plastic lubricant material which is introduced between the plug and the bore metal seating surfaces is to provide an adherent plastic sealing film which will not be displaced by the pressure of the upstream fluid.

As the pressures upstream become higher and as the pipe line sizes increase with attendant increase in total lateral pressure exerted on the plug, the spaces which must be sealed by the lubricant become increasingly larger and when the spaces around the sides of the plug become so large that the high pressure fluid can act upon sufficient projected area of the lubricant it will remove the lubricant seal and the plug valve will leak.

With higher line pressures, more viscous and more adherent lubricants have been proposed for sealing the increasingly wide spaces between the plug and the bore, but this practice is of course limited considerably by difficulty in introducing high viscosity plastic materials through the necessarily limited lubricant supply bore and channel formations and also in introducing them into the film size space between the plug and the bore.

It has been proposed to increase the sizes of the plugs in these valves for high pressure pipe line assemblies, but sealing difficulties increase considerably as the plug sizes become larger, the turning effort is materially increased, the lubricant pressures necessary for jacking become quite large, and the very practical disadvantage of tremendously increased manufacturing costs tend to discourage this line of development.

It has also been proposed to provide valves having full round openings for optimum fluid flow conditions and minimum pressure losses. Plug valves with such full round openings necessarily must be larger than those of the same capacity having rectangular openings, and in these larger round opening valves the same sealing difficulties and higher turning efforts are encountered.

The present invention therefore contemplates the provision of a valve for high pressure large pipe line service which has metal to metal seating surfaces of apperciable area with provision for a relatively low turning effort between 90° apart open and closed positions and which has a full round opening equal to the pipe line diameter to prevent pressure lowering restrictions in the line and to enable standard scrapers to be pulled through the valve as though it were a substantial continuation of the pipe line. The ball type valve wherein the movable valve element is a substantially spherical ball rotatable about an axis perpendicular to the pipe line axis on cooperating spherical seats is used in the invention because it affords the desirable full round opening with uniform wide continuous seating surfaces and 90° turning between open and closed positions.

The ball valve has furthermore been selected for purposes of the invention because the spherical seat on the downstream side, being partially coextensive with the surface of the ball, is in full surface contact therewith over a substantial area to afford a sufficient area wherein the bearing pressures per unit area are widely and evenly distributed, and provides a complete circular area of sealing surface about the downstream port. High line fluid pressures therefore are supported over the full seating surface area thus provided.

Ball valves have, of course, been known for years and many different ball valve constructions are in every day use particularly in water sprinkler systems and others with relatively small pipe lines where the pressures are relatively low. A survey of the commercial ball type valves in present day use for this service shows that the maximum rated pressure of these valves is about 175 pounds per square inch pipe line pressure. Some of these ball valves have special and complicated expensive arrangements for handling higher pressures. Such valves would of course be useless in a fuel oil pipe line of ten inch diameter size, for example, where the pressures are upward of one thousand pounds per square inch with consequent total pressures that are very large because of the large exposed area of the ball.

I have found that the presently available ball type valves on the market, when subjected to high line pressures, particularly in large size valves, either present extremely high operating torques when made with fiber seat inserts or fail to seal satisfactorily when metal seats are provided. Further even if the metal seats provide an initially satisfactory seal, the corrosion or pitting of such seats by line fluid or wearing or scratching due to debris in the line soon results in leakage.

I have found that the inability of these present day ball valves to withstand high line pressures is the result of their present construction wherein the upstream and downstream seats are usually part-spherical insert rings of fiber, asbestos or other substantially resilient and deformable material which are urged tightly against the ball surface in the valve assembly so that they may deform and conform accurately to the ball surface over a wide area and thereby provide satisfactory sealing contact for the purposes under operating conditions. However, the very fact that these seats are tightly and deformably pressed against the ball to obtain the seal proportionately increases the turning effort necessary to open and close the valve, and this has been a very important factor in limiting the size of such valves because the seating pressures needed for adequately sealing such valves to withstand line pressures upward of 175 pounds per square inch would render the ball operating torque so great the valve would not be practical.

Also, these fiber insert seats become worn after some use, or they may become crystallized and hardened and set and therefore no longer resilient after the passage of time and through deterioration by the fluid being handled. They must be very carefully selected to avoid the eroding and corroding effects of line fluid and to avoid deterioration under high temperature operating conditions. Hence, I have not been able to adapt present day ball valves to my purpose simply by increasing the size or making other such conventional changes in such valves. It has been necessary to provide a valve having an entirely new structure and mode of operation to satisfactorily solve the above mentioned problems.

In the valve of my invention, the ball although of larger diameter is substantially the same type as heretofore used, having a fully round through opening which may be aligned with the opposite pipe line ports, but the downstream seat is a circular metal area, which may be an insert or may be integral with the valve body as desired. This downstream seat constitutes a wide annular spherical sector completely surrounding the port opening in the downstream side of the valve body and it provides adequate physical strength for supporting the ball against high line pressures.

In order to provide a plastic sealing film at this seat at the downstream side of the valve, I provide suitable lubricant grooves in the seat around the downstream port connected to a reservoir of lubricant, so that lubricant under pressure may be supplied to the grooves and thence to the adjacent spaces between the seating surfaces of the ball and body for providing a complete continuous sealing film entirely about the downstream opening in the valve body when the valve is in open or closed position. This lubricant film also reduces the torque needed to turn the valve in its seat.

In the preferred embodiment of the invention, I also provide for jacking of the valve ball from its seat by increasing the lubricant pressure, and to this end I provide at the upstream side of the valve a substantially spherical annular insert seat or guide member which is flexible or resiliently backed to permit upstream displacement of the ball parallel to the pipe line axis upon the application of sufficient lubricant pressure at the downstream seat grooves. The entire jacking pressure is exerted from the grooves. I have found that this novel ball valve construction may be employed for pipe line pressures considerably in excess of 175 pounds per square inch and upwardly through one thousand pounds per square inch by actual tests that reveal no leakage through the ball valve and provide low operating torques. Preferred embodiments of the invention will be described below, although it will be understood that these actual constructions are illustrative and not intended to limit the true scope of the invention.

It is the major object of my invention to provide a novel valve construction suitable for large pipe line and other high pressure services having a full round opening and adequate bearing area with provision for both lessening the turning effort of the valve element and effecting a tight shut-off against the line fluid.

It is a further object of my invention to provide a novel ball valve construction for high pressure and large pipe line services wherein the ball has substantially metal to metal contact with the downstream seat over a sufficiently wide annular spherical area to adequately support the thrust of the ball resulting from high line pressures, and special lubricant grooves are provided at the downstream seating surfaces for providing a plastic sealing film preventing leakage of line fluid past the valve.

A further object of my invention is to provide a novel lubricated ball type valve having provision for jacking the ball from its downstream seat when the valve is in either open or closed position, or an intermediate position.

It is a further object of my invention to provide a novel ball type valve wherein the downstream seating surfaces are provided with wide lubricant grooves that extend about the port opening at that side and wherein the upstream valve seat is flexibly urged against the ball so that it may be displaced in the upstream direction by lubricant pressure applied from the lubricant grooves at the downstream side.

A further object of my invention is to provide a ball type valve wherein lubricant grooves are provided about the port in the downstream seat and wherein provision is made for cutting off the supply of lubricant to these grooves when the valve is being turned between fully open and fully closed positions, and wherein jacking of the plug may be accomplished if stuck, regardless of in what position the plug may be disposed.

A further object of the invention is to provide a ball type valve having a lubricant reservoir either in the ball stem or the valve body.

A further object of the invention is to provide a lubricated valve wherein the seating surfaces and the lubricant grooves are not exposed to line fluid when the valve is in fully open or closed positions.

Further objects of the invention will become apparent as the description proceeds in connection with the appended claims and the annexed drawings wherein:

Figure 1 is a top plan view of a ball valve constructed according to a preferred embodiment of the invention;

Figure 2 is a section substantially on line 2—2 of Figure 1 illustrating the relation of the ball to its seat within the valve body;

Figure 3 is a fragmentary elevation looking from the upstream side at the downstream seat within the body of the valve, particularly illustrating the lubricant grooves therein;

Figure 4 is a fragmentary elevation looking from the downstream side at the upstream seat of the valve, partially broken away and sectioned to show the spring which resiliently backs the upstream seat insert;

Figure 5 is an enlarged fragmentary section illustrating a portion of the downstream seat and the wide lubricant groove construction;

Figure 6 is an enlarged section on line 6—6 of Figure 3, illustrating how each short groove on the ball bridges the associated seat land;

Figure 7 is a top plan view of the ball illustrating particularly the short grooves formed therein to bridge the lubricant grooves in the downstream seat during fully open and fully closed positions of the valve;

Figure 8 is a side elevation of the ball as it appears looking inwardly from the downstream seat of the valve in closed position;

Figure 9 is a similar side elevation of the ball illustrating its appearance as viewed from the downstream side of the valve when the valve is fully open;

Figures 10, 11:
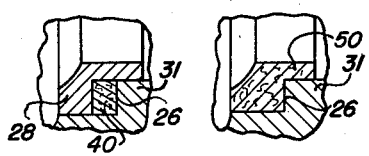
Figure 10 is a fragmentary section illustrating a further embodiment of the invention where the metal upstream seat is flexibly backed by a fiber ring.
Figure 11 is a similar fragmentary section illustrating a further embodiment of the invention wherein a fiber or other resilient ring insert is used as the upstream valve seat.

Referring to Figures 1–9, the valve body comprises two rigid metal casing body parts 11 and 12 formed with integral radial flanges 13 and 14 joined together in a plane perpendicular to the pipe line axis by a series of bolt assemblies 15. An O-ring 16 of rubber or the like provides a fluid tight joint at the flanges.

Main body part 11 which is the downstream side is formed with a threaded bore 17 within which is connected the threaded end of a pipe 18 to the downstream line. Tail part 12 is formed with a threaded bore 19 of the same diameter and aligned with bore 17. Upstream pipe 20 is secured in bore 19.

Inwardly of bore 17 is a square-cornered recess providing an axially facing flat annular shoulder 21 that is perpendicular to the common axis of bores 17 and 19, and a substantially cylindrical wall 22 concentric with the bores. A downstream seat for the valve ball later to be described comprises an annular metal insert 23 in the recess. In the preferred embodiment, wherein the valve body parts are cast and of a brass composition, the ring 23 is of steel pressed, shrunk or otherwise tightly fitted into the recess wall 22 with its outer flat side flush with and backed by shoulder 21.

Between the ends of pipe 18 and shoulder 21 is an internal body flange 24 whose inner diameter equals the pipe diameter.

Insert ring 23 is formed on its inner side with annular surface 25 which is a sector of a sphere having its center on the pipe line axis as indicated at O in Figure 2.

At the other side of the valve body, body part 12 is formed with an internal recess providing a flat radial shoulder 26 parallel to shoulder 21 and a cylindrical wall 27 concentric with the axis of bore 19. The upstream valve seat is mounted in this recess and comprises an annular metal member 28 axially slidably mounted within wall 27. A reduced diameter tubular extension 29 of ring 28 is slidably disposed within an internal body flange 31, against which flange the end of pipe 20 may abut.

Ring 28 is formed on its inner side with an annular surface 32 that is a sector of a sphere having its center on the pipe line axis at O. A circular crimped spring 33 is disposed in the recess surrounding ring extension 29 and compressed between the back face of ring 28 and shoulder 26, whereby ring 28 is resiliently urged to the left in Figure 2 to urge the upstream seat into contact with the ball and is capable of displacement in the upstream direction for a purpose to appear.

The spherical ball element 34 is mounted within the casing body with its center coincident with point O and with opposite side sectors in metal to metal engagement with spherical seat areas 25 and 32 on the body. Preferably the external surface of the ball is chromium plated for hardness against erosion and for reduced bearing friction. Ball 34 is illustrated in valve open position in Figure 2, with its through port 35 aligned with the side openings in the valve body. Port 35 is a symmetrical cylindrical bore which preferably has the same internal diameter as pipes 18 and 20, so that the valve body and ball provide a substantially constant diameter continuous passage with the pipes.

The top of ball 34 is formed with a straight sided surface recess 36 to loosely receive with a slidable fit a tongue or key 37 integral with a rotatable valve stem 38 which, Figure 2, projects upwardly through a bonnet 39 externally of the body. A gland nut 41 threaded within the bonnet surrounds valve stem 38 and is tightened to compress the stem packing 42. A suitable lever 43 non-rotatably secured upon valve stem 38 may be rocked between 90° apart valve open and closed positions as illustrated in Figure 1, stops 44 and 45 on the lever coacting with a stop 46 on the body for this purpose.

Ball 34 is therefore mounted for rotation on seats 25 and 32 and has a floating tongue and slot connection with the valve stem 38 which is rotatable about an axis that intersects the point O at right angles to the pipe line axis, so that ball 34 rotates about the axis of stem 38 during operation with its surface always in contact with both seats 25 and 32.

Lubricant, which is preferably a conventional plug valve lubricant, is introduced into the downstream valve seat to provide an annular plastic sealing film between the valve ball and smooth surface 25. This is accomplished by grooving the surface 25 as illustrated in Figure 3 and providing a source of lubricant connected to the grooving.

Referring to Figure 3, surface 25 is formed with two shallow grooves 47 and 48 of the same size that are each substantially semi-circular and separted only by short lands 49 and 51 that comprise extensions of surface 25. Lands 49 and 51 are diametrically opposite and preferably of the same size and are located at the top and bottom respectively of insert ring 23. An opening 52 in the bottom of groove 47 communicates with a body passage 53 of the same size that extends to a lubricant reservoir space 54 within a side boss 55 on body part 11. Boss 55 is internally threaded to receive a lubricant compressor screw 56.

Referring now to Figures 6–9, the surface of ball 34 is provided with two pairs of short shallow grooves 57, 58 and 59, 60. Grooves 57 and 58 are parallel and located equidistantly above and below ball port 35 so as to be cooperatively aligned with lands 49 and 51 respectively when the valve ball 34 is in valve open position, and similar grooves 59 and 60 which are displaced 90° about the axis of stem 38 are so located as to be aligned with lands 49 and 51 when the ball has been rotated to fully closed position.

Grooves 57, 58 and 59, 60, although short, are long enough to bridge lands 49 and 51 when associated therewith as illustrated in Figure 6, and therefore function to connect grooves 47 and 48 at opposite ends and thus provide grooving completely encircling the downstream port when the valve is substantially completely open or completely closed.

When stick lubricant is placed in reservoir 54 it may be pressurized and displaced into the groove 47 by rotating screw 56. Only when the ball 34 is in either of its 90° limit positions of full closed or full opening do the short grooves on the ball communicate groove 47 with groove 48 so as to connect groove 48 with the lubricant supply. While the ball is being rotated clockwise in Figure 1 between its fully open and closed positions, the seat groove 48, when it is exposed to the line fluid, is cut off from the reservoir connected groove 47, so that if the lubricant in the lubricant reservoir is further compressed to jack the ball from its seat, which may be necessary if it should be stuck in the partially opened position, a high jacking pressure may be developed in groove 47 to effect the jacking of the ball. The spherical ball, moreover, adapts itself to optimum sealing positions on the seat in all degrees of rotation since it is substantially floatingly mounted between the upstream and downstream seats.

Increase of lubricant pressure in the lubricant system when the ball is in open or closed position, as by turning screw 56, fills the groove system entirely and spreads lubricant over the bearing seat and applies a balanced lateral pressure to the ball over a substantially continuous circular area surrounding the port opening. All force components of this pressure except those directed parallel to the pipe line axis combine to oppose and neutralize each other, and the force components parallel to the line axis combine to displace the ball from its downstream seat and toward its upstream seat against the upstream fluid pressure.

A plastic sealing film of the lubricant under pressure is extruded from grooves 47 and 48 into the spaces between surface 25 and the adjacent surface of ball 34, thereby providing a fluid tight seal entirely about the downstream valve opening. Should ball 34 have been frozen to seat 25, as by corrosion or electrolytic action, increased pressure exerted through the lubricant will free the ball and displace more lubricant into the space between the seating surfaces. This upstream displacement or jacking of the ball is permitted by its connection with stem 38 and the resilient backing of upstream seat ring 28 which moves with the ball as permitted by collapse of spring 33 which maintains contact between the upstream valve seat and the ball at all times.

Since all of the jacking pressure must be provided by lubricant in grooves 47 and 48, I make grooves 47 and 48 much wider than the grooves that have been common in tapered plug valve practice. For example, for a ball valve having a two inch port used in line service up to three hundred pounds per square inch I have found it satisfactory to provide a downstream seat having a width S (Figure 5) of about three-eighths of an inch and a groove width G of about one-sixteenth of an inch. This provides ample total applied pressure on the ball for jacking and adequate film size. The grooves 47 and 48 may be about one-thirty-second of an inch in depth in this valve. For ten inch opening valves in lines carrying pressures in the order of one thousand pounds per square inch, one-half inch wide and wider grooves are contemplated.

I have therefore provided a ball type valve that is adapted for high pressure service and may be cleaned with conventional line scrapers. This is the first ball type valve to my knowledge employing satisfactory metal seating surfaces. I have found that provision of the lubricant film eliminates the need for trying to closely fit the ball into the seating surface as by lapping. This is also the first ball type valve to my knowledge wherein the ball may be jacked from its seat by lubricant pressure to free a ball that is stuck and to lessen the torque required to turn the valve. The lubricated valve above described does not leak and may be turned easily even at line pressures of three hundred pounds per square inch. When not lubricated, this valve leaks copiously at line pressures of one hundred and fifty pounds per square inch and the turning effort is considerably greater than when lubricated. The term "flexible" as employed herein to describe the upstream seat is intended to include flexibly backed rigid seat rings as well as deformable seat rings.

There is no necessity to provide a sealing film of lubricant at the upstream seat since in a one way flow valve of the type described the function of upstream seat ring 28 is more a ball retaining and guiding action.

Figure 10 illustrates a further embodiment of the invention wherein upstream seat ring 28 is backed against shoulder 26 by a ring insert 40 of fibre or some flexible or resilient material that functions equivalently to spring 33 but may have increased corrosion and rust resistant properties. Similarly Figure 11 illustrates a still further form of upstream valve seat wherein the entire insert ring 50 is made of fibre or the like pressed tightly into the recess against shoulder 26 and deformable under the lubricant pressure maintained in the downstream grooves.

Figure 13:
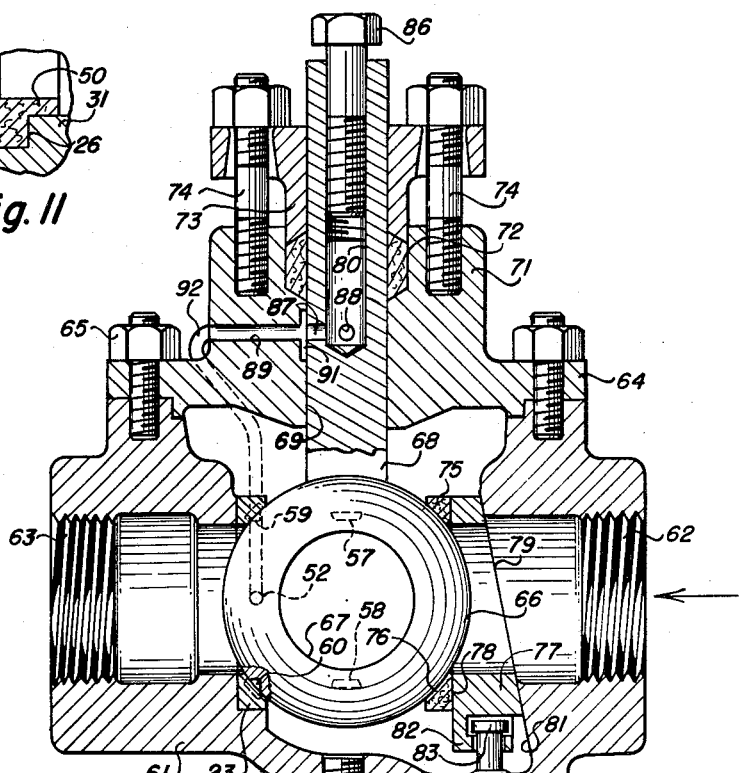
Figure 13 is a section through the valve of Figure 12 illustrating the seat construction and the lubricant distribution.
Figure 12:
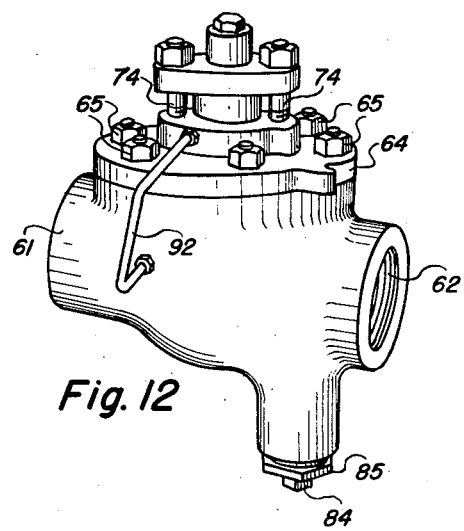
Figure 12 is an elevation of the valve according to a further embodiment of the invention illustrating an adjustable upstream seat and a ball that has an integral stem in which is located a lubricant reservoir operably connected to the downstream valve seat grooves.
Figure 14:
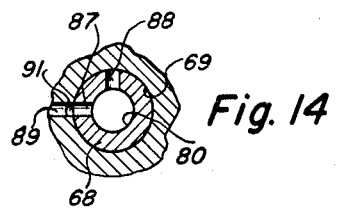
Figure 14 is a fragmentary view in section illustrating the valve stem cut-off arrangement in the lubricant supply.

Figures 12-14 illustrate a further illustrative mode of practicing the invention wherein the principles of the invention are embodied in a ball valve of different construction and wherein the lubricant supply to the groove system is cut off during rotation of the ball between open and closed positions.

This valve comprises a body 61 having aligned upstream and downstream connected passages 62 and 63 of the same size. Body 61 is formed with an internal shouldered recess wherein is pressed or otherwise secured the downstream valve insert ring 23 which is the same as that disclosed in Figures 2, 3, 5 and 6. The valve receiving recess of Figure 13 is however open at its top to provide access thereto upon removal of top closure 64 secured to the body by studs 65.

A ball 66 having a through port 67 is like ball 34 of the previously described embodiment except that ball 66 has an integral or otherwise rigid cylindrical stem 68 that is rotatable within a bore 69 of closure 64. Closure 64 is formed with a boss 71 containing a packing 72 about valve stem 68 and a gland 73 is secured to the closure by studs 74 which may be tightened to compress the packing and prevent leakage of any fluid along the valve stem.

The upstream seat of the ball 66 is a fibre or like deformable ring 75 having a spherical sector surface 76 engaging the surface of ball 66. Ring 75 is backed by a relatively slidable annular wedge 77 which preferably has a flat face 78 perpendicular to the pipe line axis slidably engaging the rear flat face of ring 75 and an inclined flat face 79 slidably engaging an inclined body wall 81.

The lower end of wedge 77 is formed with a slotted extension 82 for rotatably receiving the shouldered head 83 of a rotatable adjustment screw 84 threaded in the body. A packing and gland assembly at 85 seals against escape of fluid along screw 84. When screw 84 is rotated to shift the wedge 77 inward, upstream seat ring 75 is urged against the surface of ball 66. Outward movement of the wedge reverses this action.

In this embodiment of the invention the lubricant reservoir space is in a bore 80 in valve stem 68. An adjustable lubricant compressor screw 86 is threaded in the bore, and outlet passages 87 and 88 which are 90° apart are provided between bore 80 and the surface of the valve stem. A radial passage 89 is drilled in boss 71, and a longitudinal recess 91 is formed in bore 69 at the inner end of passage 89. By this construction, since valve stem 68 is rotatable between 90° apart fully open and fully closed valve positions as in the previous embodiment, the lubricant reservoir may be connected to passage 89 only at the fully open or fully closed positions of the valve ball. The recess 91 assures that the inner end of passage 89 may connect with passages 87 or 88 without special provision for alignment of the passages.

The outer end of passage 89 is constantly connected by a conduit 92 to the open end of a suitable passage drilled in the valve body and leading to opening 52 in the groove 47 of the downstream valve seat. Thus lubricant may be supplied under pressure to the groove system of the valve only when the valve is fully open or fully closed, and the lubricant supply is cut off from the grooves in the intermediate positions of rotation of the ball.

Since ball 66 is provided with short grooves like those of ball 34, the operation of this embodiment of the invention is otherwise the same as that earlier described. Upstream movement of the ball 66 under lubricant pressure is resiliently resisted and permitted by seat ring 75 which is constantly in contact with the ball surface.

The reservoirs 54 of Figure 1 or in bore 80 of Figure 13 may be made adequately large or, if desired, an external lubricant fitting of adequate capacity may be provided, to insure an adequate supply of plastic lubricant material.

Instead of conventional incompressible plug valve lubricants, I may provide in either of the reservoirs at 54 or 80 a mass of a suitable sealing plastic material having the viscosity of usual plug valve lubricants but containing a dispersion of small discrete particles or bubbles of air, carbon dioxide or some other gas that is inert with respect to the plastic material and also inert with respect to the line fluid to be handled. This mass is compressed by manipulation of screws 56 or 86 so that the mass is energized and is maintained as an expansible energized mass that is constantly available to displace a portion thereof through the connecting passages to the grooves in the downstream seat.

This feeding pressure stored in the energized lubricant is not high enough to jack the ball off its seat, but jacking pressure can be obtained when desired simply by manipulating the screws 56 or 86 until the forces transmitted through the compressed material are sufficient to separate the valve ball from the seat.

Thus I can supply in the valve assembly an automatically feeding energized supply of plastic sealing material for automatically maintaining the lubricant grooves filled with that material for a considerable period of time without any manual attention.

A further advantage of the above construction is that the ball can be lapped into the downstream seat under temperature conditions that approximate actual operation. This can be done by feeding the lapping compound through the lubricant passages to the downstream seating surface, while rocking the valve in its seat and while maintaining the seat hot as by passing hot liquid through the valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve, a body, a ported ball rotatable in the body on a rigid annular downstream seat and an upstream seat that is mounted for flexure in a direction normal to the axis of rotation of the ball, grooving for providing a substantially continuous band of lubricant under pressure at the downstream seating surface of the ball in predetermined positions of rotation of the ball, a stem for said ball, a lubricant reservoir in said stem, a body passage constantly connected to said grooving, and means connecting said reservoir to said body passage substantially only when said ball is in said predetermined positions of rotation.

2. In a valve, a body, a ported ball rotatable in the body, an annular downstream seat ring mounted in the body to engage one side of the ball and an annular upstream seat ring that engages the other side of the ball and is mounted within the body for displacement in a direction normal to the axis of rotation of the ball, said body being wholly supported by said seat rings, grooving for providing a continuous sealing band of lubricant at the downstream seating surface of the ball in predetermined positions of rotation of the ball, a stem for said ball rotatably mounted in the body, a lubricant reservoir in said stem, a body passage constantly connected to said grooving, and means connecting said reservoir to said body passage substantially only when said ball is in said predetermined positions of rotation.

References Cited in the file of this patent

UNITED STATES PATENTS

| 2,048,386 | Jacobsen | July 21, 1936 |
| 2,169,810 | Mueller | Aug. 15, 1939 |
| 2,175,867 | Ballard | Oct. 10, 1939 |
| 2,297,161 | Newton | Sept. 29, 1942 |
| 2,299,517 | Volpin | Oct. 20, 1942 |
| 2,313,090 | Reiser | Mar. 9, 1943 |
| 2,333,424 | Humphreys | Nov. 2, 1943 |
| 2,373,628 | Gleeson | Apr. 10, 1945 |
| 2,480,529 | Waag | Aug. 30, 1949 |
| 2,520,288 | Shand et al. | Aug. 29, 1950 |

FOREIGN PATENTS

| 464,744 | France | Jan. 21, 1914 |
| 415,810 | Great Britain | Sept. 6, 1934 |
| 617,444 | Great Britain | Feb. 7, 1949 |